United States Patent [19]

Matson et al.

[11] 4,289,532
[45] Sep. 15, 1981

[54] PROCESS FOR THE RECOVERY OF GOLD FROM CARBONACEOUS ORES

[75] Inventors: Raphael F. Matson; Bernard M. Fisher, both of New Orleans, La.

[73] Assignee: Freeport Minerals Company, New York, N.Y.

[21] Appl. No.: 125,926

[22] Filed: Feb. 29, 1980

Related U.S. Application Data

[63] Continuation-in-part of Ser. No. 99,565, Dec. 3, 1979, abandoned.

[51] Int. Cl.$^3$ .............................................. C22B 11/08
[52] U.S. Cl. ........................................ 75/105; 75/106; 75/118 R; 423/25; 423/29
[58] Field of Search .................. 75/118 R, 105, 106, 75/107, 101 R; 423/24, 25, 29

[56] References Cited

U.S. PATENT DOCUMENTS

| | | | |
|---|---|---|---|
| 1,461,807 | 7/1923 | Silver | 75/118 R X |
| 2,147,009 | 2/1939 | Chapman | 75/2 |
| 2,234,140 | 3/1941 | Falconer et al. | 423/29 |
| 2,315,187 | 3/1943 | Chapman et al. | 75/2 |
| 2,476,420 | 7/1949 | Krebs | 75/106 |
| 2,478,652 | 8/1949 | Byler et al. | 75/118 R X |
| 2,479,930 | 8/1949 | Herkenhof et al. | 423/25 |
| 3,574,600 | 4/1971 | Scheiner et al. | 75/105 |
| 3,639,925 | 2/1972 | Scheiner et al. | 75/101 R |
| 3,846,124 | 5/1974 | Guay | 75/112 |
| 3,935,006 | 1/1976 | Fischer | 423/25 X |
| 4,038,362 | 7/1977 | Guay | 423/40 |
| 4,188,208 | 2/1980 | Guay | 423/25 X |

Primary Examiner—G. Ozaki
Attorney, Agent, or Firm—Raul V. Fonte

[57] ABSTRACT

The recovery of gold from refractory carbonaceous gold-containing ores by cyanidation techniques is improved by subjecting an oxidized slurry of this type of ores to simultaneous cyanidation and countercurrent granular activated carbon adsorption in two or more stages. The gold transfers to the carbon and may be separated from it by conventional methods.

6 Claims, 1 Drawing Figure

PROCESS FOR THE RECOVERY OF GOLD FROM CARBONACEOUS ORES

RELATED APPLICATION

This application is a continuation-in-part of applicants' application Ser. No. 099,565, filed Dec. 3, 1979, and entitled "Process for the Recovery of Gold From Carbonaceous Ores", now abandoned.

BACKGROUND OF THE INVENTION

1. Field of the Invention

This invention relates to the recovery of gold from sedimentary, carbonaceous gold-containing ores which are refractory to standard cyanidation techniques. In the context of this disclosure "carbonaceous gold-containing ores", or, simply, "carbonaceous ores", denote refractory gold-containing ores which also contain organic carbonaceous matter which exhibits the property of inhibiting or substantially reducing the extraction of gold from such ores by conventional cyanidation technology. The invention relates, more particularly, to an improved process for the treatment of these ores which makes use of simultaneous cyanidation and carbon adsorption to obtain consistently high gold recoveries.

2. The Prior Art

Sedimentary carbonaceous gold-bearing ores are found in Nevada, Utah, California and other states in the United States, as well as other countries throughout the world. These ores are not amenable to standard cyanidation techniques because the carbonaceous impurities with which they are associated tend to tie up the cyanide gold complexes in chemical compounds from which the gold cannot be separated by standard methods. Also, gold may be associated with organometallic complexes in the ore which are not attacked by the cyanide complexing agents used in conventional cyanidation techniques. Conventional cyanidation techniques can normally recover only up to about 50 percent of the gold which is present in these ores.

Prior art methods for dealing with the problem of carbonaceous impurities in gold-containing ores have been confined, for the most part, to various treatments of the ore prior to cyanidation in attempts to make it more amenable to the cyanide leaching action. Thus, for example, U.S. Pat. No. 1,461,807 discloses the use of certain mineral oils for "blinding" the action of the carbonaceous impurities on the cyanide complex formation; U.S. Pat. No. 2,234,140 teaches that certain wetting agents can make the ore more amendable to cyanidation; U.S. Pat. No. 3,639,925 discloses the use of sodium hypochlorite and calcium hypochlorite as agents for oxidizing the carbonaceous material so as to prevent it from absorbing the gold cyanide; and U.S. Pat. No. 3,846,124 calls for a chlorine pretreatment of the ore, in the absence of any alkaline material, in order to decompose the organic carbonaceous components and remove them prior to cyanidation. In addition, U.S. Pat. No. 3,574,600 teaches that certain acids can be used in conjunction with an ozone treatment prior to cyanidation to oxidize the carbonaceous impurities; and U.S. Pat. No. 4,038,362 discloses a preoxidation technique, which is carried out in the absence of extraneous alkaline material, for reducing the amount of chlorine needed to pretreat the ore, as in the '124 patent. Alternatively, calcining of the ore, prior to cyanidation, has also been suggested as a way of oxidizing all of the organic constituents and thus prevent the carbon from interfering with the cyanide leaching action. Calcining operations, of course, tend to generate mercury, arsenic and sulfur-containing gases, the release of which to the atmosphere is extremely undesirable from an environmental standpoint.

Methods which involve treatment during cyanidation include those of U.S. Pat. Nos. 2,147,009 and 2,315,187, which cover the use of finely divided charcoal during cyanidation to simultaneously leach the gold values from the ore and adsorb them on the charcoal, so as to maintain the solution continuously depleted of gold and thereby improve cyanidation efficiency.

These prior art methods have proven satisfactory in some cases, but have not been able to provide a solution to the problems caused by the organic carbon in some of the more refractory ores such as the ores found in the Jerritt Canyon and Marlboro Canyon areas of Elko County, Nevada, and other equally refractory carbonaceous ores. Thus the methods of U.S. Pat. Nos. 1,461,807 and 2,234,140 work well on ores when inorganic carbon predominates, but do nothing or very little to alleviate the problems caused by adsorption of the gold cyanide complex as a result of the presence of organic carbon in ores such as those contemplated by the process of this invention. Likewise, the method of U.S. Pat. No. 3,639,925 provides only a partial solution to the problem of handling very refractory ores because, even though the hypochlorite treatment makes them more amenable to cyanidation, recoveries are not satisfactory unless high levels of hypochlorite are used. Chlorination methods such as those of U.S. Pat. No. 3,846,124 do not yield very good recoveries in spite of the fact that they call for very high consumption of chlorine or hypochlorite and are, consequently, very expensive, usually necessitating additional steps such as the preoxidation step of U.S. Pat. No. 4,038,362, which entails heating the slurry to elevated temperatures while bubbling air for long periods of time.

The method of U.S. Pat. No. 3,574,600 consumes expensive ozone and acid and has essentially the same effect as the method of U.S. Pat. No. 3,639,925 with its attendant shortcomings. In addition, it must be carried out at very low pH values, which makes it unsuitable for treating calcium carbonate-containing ores such as the sedimentary ores treated by the process of this invention.

Finally, the methods which deal with treatment during cyanidation, that is, those of U.S. Pat. Nos. 2,147,009 and 2,315,187, treat oxide type ores, not carbonaceous ores, and use finely divided charcoal, not granular activated carbon. These methods do not work on the carbonaceous ores of this invention, partly because the carbonaceous material present in the ores of this invention inhibits the dissolution of gold complexes and prevents finely divided charcoal from removing the gold from the cyanide leach solution. In addition, finely divided charcoal cannot be separated by means of screening.

Obviously, a process is needed that can recover the gold values from ores containing substantial quantities of organic carbonaceous matter without consumption of large amounts of expensive reagents such as chlorine.

It is an important object of this invention to provide an economical process for treating highly refractory, carbonaceous, gold-containing ores which does not suffer from the disadvantages of prior art processes and which, at the same time, results in high yields of gold extraction from said ores.

SUMMARY OF THE INVENTION

The present invention provides a process whereby improved recovery of gold is obtained from carbonaceous ores which are otherwise refractory to gold extraction.

In accordance with the process of the invention an aqueous slurry of a carbonaceous gold-containing ore is oxidized and then subjected to simultaneous cyanidation and granular activated carbon absorption in two or more solid-liquid extraction stages, where the ore flows countercurrent with the carbon and the gold transfers to the carbon. The gold-loaded carbon can be separated from the gold-depleted slurry by means of screening, and the gold values may be removed from the gold-loaded carbon by any number of conventional operations such as stripping with hot caustic cyanide solution. The carbon can then be conveniently recycled to the solid-liquid extraction stages to be reused in the simultaneous cyanidation and granular carbon adsorption operation.

DETAILED DESCRIPTION

Figure 1:
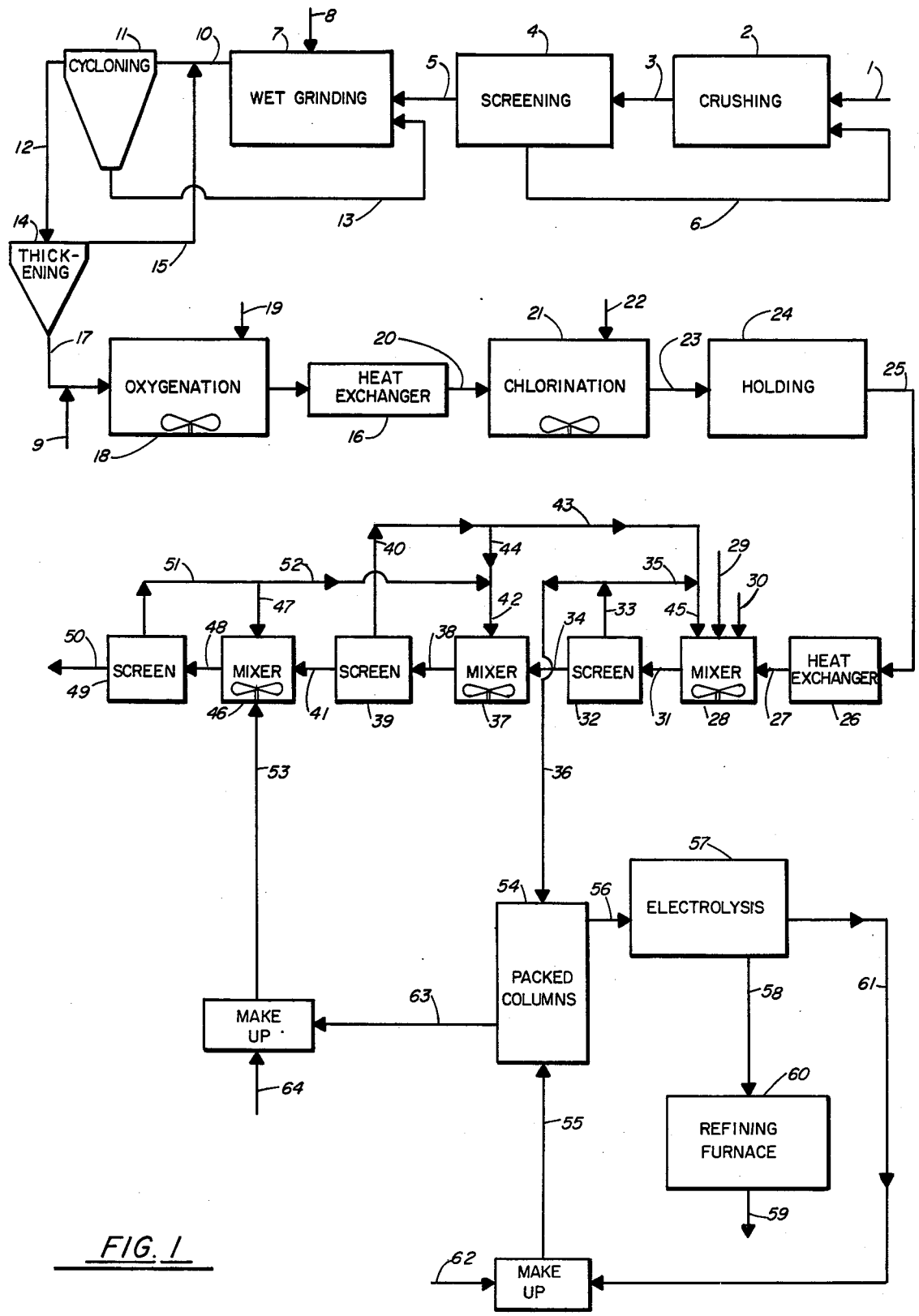
FIG. 1 is a flowsheet diagram illustrating one mode of operation of the process of this invention.

Referring to FIG. 1, carbonaceous ore 1 is fed to crushing operation 2 where it is crushed, for example, by a cone crusher. Carbonaceous ore 1 is a gold-bearing ore, normally containing anywhere from 0.05 to 1.0 ounce of gold per ton and from about 1 to about 8% by weight total carbon. The organic carbon content of the ore is usually between about 0.5 and 1% by weight. Essentially all of the inorganic carbon is in the form of carbonates. Sulfides of arsenic, lead, mercury and other metals are also often found in this type of ore.

Higher and lower gold and carbon contents are sometimes found in the type of ores contemplated by the process of this invention, although for the most part the gold content is rarely lower than 0.05 or higher than 2.0 ounces per ton, and the organic carbon content is seldom below about 0.25 and rarely above 3% by weight. What is characteristic of this type of carbonaceous ores is that they are not amenable to standard cyanidation techniques, that is, less than about 50% gold extraction is obtainable from them when treated by conventional straight cyanidation methods.

Crushing operation 2 reduces the ore to a size convenient for wet grinding 7. An intermediate screening 4 may be used to separate crushed ore 3 into fine fraction 5 and coarse fraction 6, with the coarse fraction returning to crushing 2 and the fine fraction advancing to wet grinding. Slurrying of the ore is done by adding water 8 at a rate sufficient to provide about 60% solids in discharge 10 from the grinding mill or mills. Preferably, the discharge from the final grinding mill is diluted to 35–40% solids and fed to a cyclone 11 for classification. The coarse ore in cyclone underflow 13 is recycled to the mill or mills and the fine ore in cyclone overflow 12 is concentrated to about 50% solids in thickener 14. Thickener overflow 15 is recycled to the grinding classification circuit and used to dilute the discharge from the grinding mill or mills, as indicated above.

Alkaline material 9 may be added during wet grinding, but is preferably added after thickening and prior to oxidation. It may also be added during oxidation. The material is preferably added to thickener underflow 17 in an amount sufficient to provide between about 10 and 100, and preferably between about 20 and 60, pounds of alkaline material, expressed as $Na_2CO_3$, per ton of dry ore. The material must be soluble in the liquid phase of the slurry, and is selected from among any of the alkali metal basic salts, oxides and hydroxides, and mixtures thereof. Preferably, soda ash ($Na_2CO_3$) is chosen as the soluble alkaline material because of its low cost and availability.

The grinding operation need not be wet grinding, that is, the ore may be dry ground first and then slurried in a separate slurrying operation. If this is done then the alkaline material may be conveniently added with the slurrying water as part of the separate operation. Wet grinding is preferred, however, for convenience in the handling of the ore.

It should be understood that, although the presence of the soluble alkaline material in the aqueous ore slurry is an essential part of the process of this invention, the particular method and manner of forming the aqueous slurry, that is, the steps of crushing, screening, grinding, thickening, etc., are not part of the invention. Indeed, many variations and modifications of the various configurations which exist of these particular techniques are known to those skilled in the art and are available for use and contemplated by the process of this invention as means for forming the slurry.

Referring to FIG. 1, again, underflow 17 is a slurry having a solids content of about 50%, a temperature between about 50° and 120° F. and a pH between about 7 and 13, depending on the point and manner of addition of the soluble alkaline material. Its gold content may be between about 0.05 and 1.0 ounce of gold per ton of dry ore, and its organic carbon content about 0.25–3% by weight. This slurry is fed to the oxidation operation, which is preferably carried out in two steps: oxygenation and chlorination. In oxygenation step 18 the slurry comes into contact with oxygen-containing gas 19, e.g., air or oxygen, in one or more tanks or similar vessels, for at least one hour, but preferably between about 4 and 20 hours while under agitation. This step is best carried out in several stages. The oxygenation reaction is exothermic, but externally-added heat is provided to keep the temperature of the mixture inside the oxygenation tanks between about 120° and 210° F., and preferably around 140°–190° F. Enough oxygen-containing gas is fed into the tanks to provide the equivalent of between about 1,000 and 10,000, and preferably between about 3,000 and 5,000, standard cubic feet of air per ton of dry ore. More preferably, the retention time during oxygenation is about 8 hours. Oxygen, of course, can be used instead of air.

The pH of the slurry tends to drop during oxygenation, and its actual value depends on the amount, manner of addition and point of injection of the alkaline material. If the alkaline material is injected during oxygenation by, for example, injecting it in each tank, or stage, the pH remains relatively constant throughout the operation. If, on the other hand, the alkaline material is added prior to oxygenation the pH may gradually drop to as low as about 8. Preferably, soda ash is added immediately prior to the oxygenation step in an amount sufficient to cause a gradual drop of the pH to about 9–10 by the end of the last oxygenation step and prior to chlorination.

It is surmised that, during oxygenation, sulfides and other sulfur compounds which are often found in the type of carbonaceous ores treated by the process of this invention are oxidized and/or the nature of the organic carbon associated with them is altered in some manner which causes an improvement in gold recoveries and a decrease in chlorination requirements. While it has been determined that oxygenation does not have the effect of decomposing the organic carbon and driving off carbon dioxide, the exact mechanism by which it works has not been precisely determined and is not quite well understood.

Following oxygenation the slurry temperature is preferably adjusted to about 70°–140° F., and more preferably to 80°–120° F., in heat exchanger 16 and the resulting slurry 20 fed to chlorination step 21. Chlorination is carried out in one or more agitated vessels, e.g., enclosed tanks provided with mechanical agitators, by injecting chlorine gas, sodium hypochlorite, potassium hypochlorite or any other suitable source of hypochlorite ions 22 into the oxygenated slurry prior to entering the vessels, or in the vessels themselves, as shown in FIG. 1. Chlorination is carried out for at least 1 hour and preferably between 1 and 6 hours at a temperature of about 70°–140° F. The amount of hypochlorite ion source 22 added should be between about 10 and 100 pounds, expressed as NaOCl, per ton of dry ore. The pH during chlorination tends to drop as the slurry advances from stage to stage, and may drop to as low as 5.

Following chlorination slurry 23 is preferably held for an additional 2–3 hours in holding tank 24 to allow any excess hypochlorite ions to be consumed and thereby avoid, or at least minimize, the presence of the hypochlorite ion during the subsequent simultaneous cyanidation and granular carbon adsorption operation. The hypochlorite ion would tend to react with the cyanide ion and interfere with this operation. Any suitable vessel, e.g., an enclosed tank, or similar, can be used for this purpose. In addition, or alternatively, air blowing through the slurry until all of the hypochlorite ions are substantially removed may be employed as a means for allowing excess hypochlorite to be consumed. No holding or air blowing is needed if the amount of excess hypochlorite ion is nil. From holding tank 24 chlorinated slurry 25, at about 70°–140° F., is preferably fed to heat exchanger 26, where its temperature is adjusted to about 40°–100° F. to minimize decomposition of the cyanide species in the operation which follows, and then fed, as slurry 27, to the simultaneous cyanidation and granular carbon adsorption operation of the process of this invention.

It is not absolutely necessary that the oxidation operation be effected by first oxygenating with an oxygen-containing gas and then chlorinating. Depending on the type and particular characteristics of the ore being processed, it has been found that the oxidation operation may also be carried out under certain circumstances in one step, by treatment with an oxygen-containing gas, without chlorination, or by chlorination, without oxygenation. Thus, slurry 17 may be treated with an oxygen-containing gas, e.g., air or oxygen, at a temperature of 120°–210° F. for at least 6 hours, and preferably for 8–12 hours, in one or more stages, then cooled to, for example, 40°–100° F., and sent to the simultaneous cyanidation and granular carbon adsorption operation. Likewise, oxidation may be effected by a chlorine treatment, without treatment with an oxygen-containing gas, by, for example, bubbling chlorine gas or some other suitable source of hypochlorite ion in an amount sufficient to provide between about 15 and 150 pounds, expressed as NaOCl, per ton of dry ore for at least 4 hours at a pH between about 5 and 11. Preferably, between 100 and 150 pounds of NaOCl per ton of dry ore would be provided, with a retention time of between 8 and 12 hours. The type and composition of the ore being processed, the cost of the chlorine consumed and other economic considerations would determine the best way of carrying out the oxidation operation.

The simultaneous cyanidation and granular carbon adsorption operation is carried out, in accordance with the process of this invention, in a plurality of stages, by simultaneously contacting the oxidized slurry with a cyanide solution and granular activated carbon, the carbon moving countercurrent with the flow of the slurry. Thus, in FIG. 1, stream 27 enters first mixing tank 28, where it contacts cyanide stream 29, containing cyanide in an amount sufficient to provide between about 0.25 and 2.5 pounds of cyanide, expressed as NaCN, per ton of dry ore. The cyanide may be added in solid form, but it may also be added as a solution, for example, as a sodium cyanide solution having between about 10 and 25% NaCN by weight, and preferably about 15% NaCN. Other cyanide solutions, e.g., solutions of KCN, Ca(CN)$_2$, etc. may also be used. The compositions and strengths of cyanide solutions best suited for cyanidation are matters known to those skilled in the art of cyanidation processes for recovering gold from ores, and their selection can be made utilizing standard cyanidation techniques criteria. Lime 30 is preferably added to maintain the pH between about 9.5 and 10.5, in order to decrease cyanide decomposition.

Also fed into tank 28 is carbon-containing stream 45, the source of which is described below. The mixture of carbon, slurry and cyanide is agitated in mixing tank 28 for a period of time long enough to provide intimate contact between all phases. Usually, between about 30 and 180 minutes of retention time, and preferably around 90 minutes, will suffice. The resulting mixture 31 is fed to screen 32 where it separates into carbon stream 33 and ore slurry stream 34. Carbon stream 33 may contain between about 50 and 800 ounces of gold per ton of carbon and normally about 100–350 ounces per ton. About 50 pounds of carbon per ton of dry ore fed to screen 32 are removed through stream 33. A substantial portion of stream 33, e.g., about 85–95%, is diverted, as stream 35, and mixed with recycle stream 43 to make up stream 45 which is fed to tank 28, as already described; another portion of stream 33, e.g., about 5–10% is removed as gold-loaded carbon stream 36, carrying with it the adsorbed gold, at a rate of about 5 pounds of carbon per ton of dry ore. This granular carbon stream, pregnant with complexed gold, is sent to one or more stripping towers, or any other suitable system, to be stripped of its gold content.

Stream 34, now containing between about 0.03 and 0.2 ounce of gold per ton of dry ore, goes into mixing tank 37 which is part of the second stage of the simultaneous cyanidation and granular carbon adsorption operation. Agitation is provided in tank 37 as in tank 28 to mix the slurry with recycle carbon stream 42, and the screening operation repeated as before. Thus, slurry 38 exits tank 37 at a gold content of about 0.015–0.1 ounce per ton of dry ore, and goes into screen 39 where it is separated into carbon stream 40 and slurry stream 41. Stream 40 is divided into stream 43, which blends with stream 35, as already described, and stream 44 which blends with recycle stream 52 to make up stream 42 which is fed to tank 37. Slurry 41 goes into the third and final stage via mixing tank 46 where it is mixed with recycle stream 47 and carbon stream 53, and leaves tank 46 as slurry 48 which is separated in screen 49 into gold-depleted slurry 50 and carbon stream 51. Stream 51 is divided into recycle stream 52 and recycle stream 47 which make their way to tanks 37 and 46, respectively.

Carbon stream 53 contains the fresh granular activated carbon of the process of this invention. Any type of granular activated carbon can be used as long as its particle size is substantially larger than the particle size of the ore being treated so as to allow for an efficient separation of the two via a screening operation or similar type of separation operation based on particle size. Since the ore particle sizes during simultaneous cyanidation and granular carbon adsorption are usually smaller than 48 mesh, granular activated carbon having particles, for example, in the 6×16 mesh size is quite acceptable. One such type of carbon is manufactured by Westates Corporation under the name of Westates Carbon Grade CC-321 G/S. This carbon is made from coconut shells and activated with steam.

Other types and grades of activated carbons can also be used. The carbon, however, must be granular carbon, that is, must not be finely divided carbon, e.g., in powder form. Thus, carbons with average particle sizes smaller than about 48 mesh are not acceptable. In the context of this disclosure "mesh" refers to the Tyler standard screen-scale sieve designation.

Enough carbon should be provided with stream 53 so as to provide between about 1 and 10 pounds of carbon per ton of dry ore being processed, and preferably between about 3 and 8 pounds per ton.

It is essential to the process of this invention that the ore flow be countercurrent to the carbon flow. It has been found that the use of granular activated carbon in this fashion, together with the oxidation operation that precedes it, results in the recovery of up to 97% of the gold values originally present in the ore, which gold values are not usually recoverable in those quantities by conventional cyaniding methods. Recoveries substantially higher than those obtained by conventional cyanidation are always obtained when the process of this invention is efficiently employed.

The cyanide solution is preferably fed to the system with the ore slurry, for example, as shown in FIG. 1, into mixer 28, and for the most part the bulk of it moves concurrent with the ore slurry, although a portion of it distributes itself throughout all stages and moves in the direction of flow of the carbon.

While, for ease of illustration, three stages are shown for the simultaneous cyanidation and granular carbon adsorption operation in FIG. 1, it will be understood that more or fewer stages may be used. In fact, we prefer to operate in eight such stages and use interstage screening. Any suitable type of particle size separation equipment may be used to separate the carbon from the slurry in between stages, as already described.

The gold is recovered from gold-loaded carbon stream 36 by conventional means for separating gold from gold-loaded carbon. One such means is stripping with hot NaOH-ethanol-cyanide solution 55 in one or more columns or towers 54 which are first packed with the pregnant carbon, and where the hot NaOH-ethanol-cyanide solution circulates while removing the gold from the carbon. The removed gold in product liquor 56 is then sent to electrolysis operation 57, where it is recovered by electrolytic deposition in stream 58, and further made into gold bullion 59 in refining furnace 60.

Spent solution 61 from electrolysis operation 57 can be recycled, preferably after blending with make up solution 62, to columns 54 as already indicated. The stripped carbon 63 leaving columns 54 can also be recycled, after regeneration and blending with make up carbon 64, as stream 53 to countercurrently contact the ore slurry, as required by the process of this invention, in, for example, tank 46, as shown in FIG. 1.

It will be understood that the manner of recovering the gold values from the gold-loaded carbon product from the simultaneous cyanidation and granular carbon adsorption operation of this invention and the manner of further separating and purifying said gold values are not part of the invention. Indeed, many techniques for doing this are known to those skilled in the art, especially those familiar with the recovery of gold values from loaded carbons obtained by the so-called carbon-in-pulp technique used to recover gold from gold-loaded cyanide solutions.

The following are examples illustrating the effectiveness of the process of the invention.

EXAMPLE 1

This example illustrates one mode of operation of the invention.

A sample of a carbonaceous gold-containing ore from the area known as Marlboro Canyon, in Elko County, Nevada, is prepared in the laboratory by crushing, grinding to $-100$ mesh and slurrying with water, and adding to it soda ash in an amount sufficient to provide 50 pounds of ton of dry ore. This slurry, at about 50% solids, 100° F. and a pH of 10, has a gold content of 0.359 ounces of gold per ton of ore and an organic carbon content of 0.49% by weight, and is representative of stream 17 in the process flowscheme of FIG. 1. The slurry is fed to oxygenation step 18 where it contacts 4,000 standard cubic feet of air per ton of dry ore while under agitation in a tank. Retention time in this step is 8 hours, and the pH of the slurry in the tank is 10. The slurry is heated so as to maintain a temperature of 180° F.

Following oxygenation the slurry is fed to indirect heat exchanger 16 where its temperature is lowered to 120° F. The resulting cooled slurry 20 is fed to chlorination operation 21, which is carried out in an enclosed vessel provided with mechanical agitation. Chlorine gas 22 is injected into the tank at a rate sufficient to provide 50 pounds of NaOCl per ton of dry ore. Retention time is 6 hours, and the temperature of the slurry is maintained at or below 120° F.

Following chlorination, slurry 23 is held for an additional 2 hours in holding tank 24 to allow excess hypochlorite ions to be consumed. Slurry 25 from holding tank 24, at 120° F. advances to heat exchanger 26 where it is cooled to 80° F. so as to minimize decomposition of the cyanide in the subsequent simultaneous cyanidation and granular carbon adsorption. Cooled slurry 27 is fed to the simultaneous cyanidation and granular carbon adsorption of the process of this invention. Accordingly, stream 27 first enters mixer 28 where it contacts cyanide stream 29 containing enough cyanide to provide 1 pound of NaCN per ton of dry ore. The cyanide is added in liquid form as a sodium cyanide solution. Like 30 is added to mixer 28, and retention time is 1 hour. The resulting mixture 31 advances to vibrating screen 32 where it separates into carbon stream 33 and ore slurry stream 34. Carbon stream 33 contains 300 ounces of gold per ton of carbon; 30 pounds of carbon per ton of dry ore fed to screen 32 are removed through stream 33. 95% of stream 33 is diverted, as stream 35, and mixed with recycle stream 43 to make up stream 45 which is then fed to mixer 28, as already described, while 5% of stream 33 is removed, as gold-loaded carbon stream 36, which carries with it the adsorbed gold at a rate of 2 pounds of carbon per ton of dry ore.

Stream 34 contains 0.1 ounce of gold per ton of dry ore and is fed to mixer 37, which is part of the second stage of the simultaneous cyanidation and granular carbon adsorption operation. Agitation is provided in mixer 37, as in mixer 28, to mix the slurry with recycle carbon stream 42 and the screening operation repeated as before. Slurry 38 exits mixer 37 having a gold content of 0.02 ounce per ton of dry ore and goes into screen 39, where it separates into carbon stream 40 and slurry stream 41. Stream 40 is divided into stream 43 which blends with stream 35, as already described, and stream 44 which blends with recycle stream 52 to make up stream 42 which is then fed to mixer 37. Slurry 41 goes into the third and final stage via mixer 46 where it blends with recycle stream 47 and carbon stream 53, and leaves mixer 46 as slurry 48 which enters screen 49 and separates into gold depleted slurry 50 and carbon stream 51. Stream 51 is divided into recycle streams 47 and 52 which end up in mixers 46 and 37, respectively.

Carbon stream 53 contains 3 pounds of Westates Grade CC-321 G/S granular carbon per ton of dry ore being processed.

The gold may be recovered from gold-loaded stream 36 by stripping with hot NaOH-ethanol-cyanide solution 55 in towers 54, which are packed with the loaded carbon; the hot NaOH-ethanol-cyanide solution moves in and out of towers 54 and in the process removes the gold from the carbon. The recovered gold, in product liquor 56, is sent to electrolytic operation 57, where it is separated by means of conventional electrolysis techniques. The spent solution 61 from the electrolytic operation is recycled to columns 54. The stripped carbon 63 may be reactivated and recycled in mixer 46. Make up carbon 64 is added to carbon 63 to make up for carbon losses in the system.

EXAMPLE 2

Comparative tests were made with ore samples from an area of the Marlboro Canyon designated as "Pit 2" by subjecting the samples to cyanidation with and without the method of this invention.

The feed for these tests were prepared by grinding and thoroughly blending about 30 pounds of the Pit 2 ore and splitting them into fifteen 900-gram samples of a gold-containing carbonaceous ore having 0.248 ounces of gold per ton of ore, 0.67% by weight organic carbon, 7.62% by weight total carbon and 1.71% by weight sulfur. The particle size of the samples was −100 mesh.

In Test A, 900 grams of this ore were slurried with 900 grams of water (50% solids slurry) in a 5-inch-diameter, 9inch-high stainless steel vessel equipped with an agitator and several baffles, and the resulting slurry subjected to oxygenation in the absence of any alkaline materials. Oxygenation was carried out by bubbling air at a rate of 600 cc/min for 8 hrs, at a temperature of 180° F., in the same stainless steel vessel. (This air rate is equivalent to about 5,000 cubic feet per ton of dry ore.) The pH during oxygenation ranged between 9 and 11.

A sample of the resulting liquor was then taken and analyzed for total sulfur and sulfate content in order to determine the extent of oxidation. It contained 0.6 gpl sulfur, indicating a conversion of sulfur to sulfate of about 30%. The oxygenated slurry was then allowed to cool to 120° F. in a separate vessel.

Standard cyanidation leaching was then carried out by mixing the cooled slurry with 0.9 grams of sodium cyanide. This is equivalent to 2 pounds of NaCN per ton of dry ore. Cyanidation was effected in rolling bottles at 75° F. for 24 hours, and using lime to maintain the pH of the slurry at 9.6–9.8. After separation of the two phases by means of filtration the solids were dried and analyzed, and showed a gold content of 0.213 ounces per ton. This means that only 14% of the gold originally in the ore was leached.

In Test B, 900 grams of ore were slurried, oxygenated, allowed to cool and leached with sodium cyanide solution in exactly the same fashion as in Test A, except that, just prior to leaching, Westates Carbon Grade CC-321 G/S activated carbon was added to the slurry in an amount sufficient to provide 20 grams of carbon per liter of slurry. After separation and analyses the gold content of the solids was 0.188 ounces per ton. This means that only 24% of the gold originally in the ore was leached.

In Test C, a sample was subjected to the same procedure as in Test A, except that soda ash was added during slurrying in an amount sufficient to provide 50 pounds of $Na_2CO_3$ per ton of dry ore. After separation and analyses the gold content of the solids was 0.224 ounces per ton, indicating that only 10% of the gold originally in the ore had been extracted.

In Test D, a sample was subjected to the same procedure as in Test C, except that, just prior to leaching, Westates Carbon Grade CC-321 G/S activated carbon was added to the slurry in an amount sufficient to provide 20 grams of carbon per liter of slurry. After separation and analyses the gold content of the solids was 0.088 ounces per ton, indicating that 65% of the gold originally present in the ore had been leached.

In Test E, a sample was slurried as in Test A but was not subjected to oxygenation; instead, the slurry was oxidized by bubbling chlorine gas through it for 4 hours at 120° F. so as to provide 78 pounds of NaOCl per ton of dry ore. Oxidation was carried out in a glass beaker equipped with a mechanical agitator. No soda ash was used in this test prior to cyanidation. After chlorination the slurry was maintained under agitation for 2 hours to allow excess hypochlorite ions to be converted to oxygen and chloride ions. Cyanidation leaching was then carried out in rolling bottles for 24 hours using the same cyanide and the same procedure as in the previous tests. No carbon was used in this test. After separation and analyses the gold content of the solids was 0.198 ounces per ton, indicating that only 20% of the gold originally present in the ore had been leached.

In Test F, the experiment of Test E was repeated except that 20 grams of the Westates carbon per liter of slurry were used during leaching as in Tests B and D. After separation and analyses the gold content of the solids was 0.161 ounces per ton, indicating that only 35% of the gold originally in the ore had been extracted.

In Test G, a sample was slurried as in Tests C and D, that is, in the presence of 50 pounds of $Na_2CO_3$ per ton of dry ore, and then subjected to oxygenation by bubbling 600 cc of air per minute for 8 hours at a temperature of 180° F. in the same stainless steel vessel used for oxygenation in previous tests. The oxygenated slurry was then allowed to cool to 120° F. in a glass beaker equipped with a mechanical agitator, and chlorinated with chlorine gas in the same amount and in the same fashion as in Tests E and F. After holding the slurry under agitation for 2 hrs to destroy excess hypochlorite ions and cooling to 75° F., the oxidized slurry was subjected to cyanidation leaching as in previous tests, but no carbon was used. After separation and analyses the gold content of the solids was 0.156 ounces per ton of ore, indicating that only 38% of the gold originally in the ore had been leached.

In Test H the experiment of Test G was repeated except that 20 grams of the Westates carbon per liter of slurry were used during cyanidation in the same fashion as in previous Tests B, D and F. After separation and analyses the gold content of the solids was 0.029 ounces per ton, indicating that 88% of the gold originally present in the ore had been leached.

Tests I and J were performed on samples of a different gold-containing ore, namely an oxide ore with the following composition: gold: 0.286 ounces per ton; organic carbon: 0.14% by weight; total carbon: 3.3% by weight; sulfur: 0.24% by weight.

In Test I 900 grams of the ore were slurried as in Test A in the absence of any alkaline material and then subjected to cyanidation leach using the same cyanide and the same procedure as in previous tests. After separation and analyses the gold content of the solids was 0.061 ounces per ton, indicating a gold extraction of 79%.

In Test J 900 grams of the ore were treated in the same manner as in Test I except that 20 grams of the Westates carbon per liter of slurry were added during cyanidation in the same fashion as in Tests B, D, F and H. After separation and analyses the gold content of the solids was 0.011 ounces per ton, indicating a gold extraction of 96%.

The results of these tests are summarized in the following table.

| Test | Type Of Ore | Na₂CO₃ | Oxygenation | Chlorination | Simultaneous Carbon Adsorption and Cyanidation | % Gold Extraction |
|---|---|---|---|---|---|---|
| A | Carb. | No | Yes | No | No | 14 |
| B | Carb. | No | Yes | No | Yes | 24 |
| C | Carb. | Yes | Yes | No | No | 10 |
| D | Carb. | Yes | Yes | No | Yes | 65 |
| E | Carb. | No | No | Yes | No | 20 |
| F | Carb. | No | No | Yes | Yes | 35 |
| G | Carb. | Yes | Yes | Yes | No | 38 |
| H | Carb. | Yes | Yes | Yes | Yes | 88 |
| I | Oxid. | No | No | No | No | 79 |
| J | Oxid. | No | No | No | Yes | 96 |

It is evident from these results that good gold extraction can be obtained from oxide ores by conventional cyanidation techniques, as indicated by Tests I and J, without using the process of this invention.

It is also evident that, when dealing with carbonaceous ores, good gold extraction is obtainable when the process of this invention is used, as in Tests D and H, but is not obtainable when the process of this invention is not used, as in the rest of the tests. More important, these results show the importance of the three critical requirements of the present invention, to wit, the presence of alkaline material during oxidation, the oxidation itself and the simultaneous carbon adsorption and cyanidation, and the fact that gold extraction falls when any one of these three is missing from the test.

The foregoing examples are considered representative of the principles of the instant invention, but are given here as illustrations only, and should not be interpreted as limiting the scope of the invention. Obviously many modifications will be apparent to those skilled in the art which fall within said scope of the invention.

What is claimed is:

1. In a process for the recovery of gold values from carbonaceous gold-containing ores by contacting an aqueous slurry of said ores with a cyanide complexing agent for the gold values, the improvement which comprises:
    (a) forming said aqueous slurry of said ores in the presence of a soluble alkaline material;
    (b) subjecting said aqueous slurry to oxidation comprising an oxygenation step, wherein said formed aqueous slurry is intimately contacted with an oxygen-containing gas for at least one hour, and a chlorination step, wherein the oxygenated slurry is intimately contacted with a source of hypochlorite ions for at least one hour;
    (c) simultaneously contacting the oxidized aqueous slurry, in a plurality of stages, with said cyanide complexing agent and granular activated carbon, the carbon flowing in countercurrent fashion with said slurry, wherein the temperatures of the slurry is maintained between about 40° and 100° F., whereby said gold values are transferred to said granular activated carbon; and
    (d) separating said granular activated carbon from said aqueous slurry.

2. The process of claim 1, wherein said oxygenation step is carried out at a temperature between about 120° and 210° F. and said chlorination step is carried out at a temperature between about 70° and 140° F.

3. The process of claim 2, wherein said oxygenation step is carried out at a pH between about 8 and 13 for 4–8 hours, the temperature of the slurry is thereafter adjusted to between about 70° and 140° F., and the chlorination step carried out at a pH between about 5 and 11 for 1–6 hours, at about 70°–140° F.

4. The process of claim 3, further comprising holding the chlorinated slurry at 70°–140° F. in a vessel separate from that in which said chlorination step takes place for a period of time sufficient to allow excess hypochlorite ions to be consumed.

5. A process for recovering gold values from carbonaceous gold-containing ores which comprises:
    (a) forming an aqueous slurry of said ores having a solids content between about 30 and 60% by weight;
    (b) adding a soluble alkaline material to raise the pH of said aqueous slurry to between about 8 and 13;
    (c) contacting said aqueous slurry with an oxygen-containing gas at a temperature between about 120° and 210° F.;
    (d) thereafter adjusting the temperature of said aqueous slurry to between about 70° and 140° F.;
    (e) thereafter subjecting the slurry to a chlorination step, wherein the slurry is contacted with a material capable of providing hypochlorite ions in solution;

(f) allowing any excess hypochlorite ions to be consumed;

(g) further adjusting the temperature of said slurry to between about 40° and 100° F.;

(h) thereafter feeding the slurry to a plurality of solid-liquid extraction stages wherein it contacts a cyanide complexing agent for the gold values and granular activated carbon flowing countercurrent with said flow of said slurry, whereby said gold values are transferred to said granular activated carbon; and (i) separating said granular activated carbon and transferred gold values contained in said granular activated carbon from said slurry by means of interstage screening.

6. The process of claim 5 further comprising separating said transferred gold values in step (i) from said granular activated carbon and recycling said granular activated carbon to said plurality of solid-liquid extraction stages.

* * * * *